(12) United States Patent
Chon

(10) Patent No.: US 12,489,129 B2
(45) Date of Patent: Dec. 2, 2025

(54) FUEL CELL SYSTEM AND METHOD FOR CONTROLLING THE SAME

(71) Applicants: Hyundai Motor Company, Seoul (KR); Kia Corporation, Seoul (KR)

(72) Inventor: Ga Jeon Chon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 659 days.

(21) Appl. No.: 17/880,078

(22) Filed: Aug. 3, 2022

(65) Prior Publication Data

US 2023/0155147 A1 May 18, 2023

(30) Foreign Application Priority Data

Nov. 16, 2021 (KR) .......................... 10-2021-0157743

(51) Int. Cl.
*H01M 8/04746* (2016.01)
*H01M 8/04089* (2016.01)
*H01M 8/04537* (2016.01)

(52) U.S. Cl.
CPC ... *H01M 8/04753* (2013.01); *H01M 8/04089* (2013.01); *H01M 8/04552* (2013.01); *H01M 8/04582* (2013.01); *H01M 2250/20* (2013.01)

(58) Field of Classification Search
CPC ......... H01M 8/04753; H01M 8/04089; H01M 8/04552; H01M 8/04582
See application file for complete search history.

(56) References Cited

U.S. PATENT DOCUMENTS

| | | | | |
|---|---|---|---|---|
| 9,368,814 | B2* | 6/2016 | Forte | H01M 8/04828 |
| 10,181,610 | B2* | 1/2019 | Forte | H01M 8/04225 |
| 11,588,166 | B2* | 2/2023 | Kim | H01M 8/04089 |
| 2012/0005910 | A1* | 1/2012 | Ogihara | G01B 21/045 |
| | | | | 33/503 |
| 2019/0252699 | A1* | 8/2019 | Forte | H01M 8/04201 |
| 2021/0135259 | A1* | 5/2021 | Park | H01M 8/04671 |
| 2023/0197989 | A1* | 6/2023 | Baik | H01M 8/04395 |
| | | | | 429/431 |
| 2023/0246210 | A1* | 8/2023 | Ahmadzadegan | ............ |
| | | | | H01M 8/04097 |
| | | | | 429/415 |

FOREIGN PATENT DOCUMENTS

| | | | | |
|---|---|---|---|---|
| EP | 2320504 A1 * | 5/2011 | .......... | H01M 16/006 |
| JP | 2013196782 A * | 9/2013 | | |
| JP | 2016-039050 A | 3/2016 | | |
| JP | 2019-186160 A | 10/2019 | | |
| JP | 2019-212563 A | 12/2019 | | |
| JP | 2021-128909 A | 9/2021 | | |
| KR | 10-1592720 B1 | 2/2016 | | |
| KR | 101616201 B1 * | 4/2016 | | |
| KR | 10-1674875 B1 | 11/2016 | | |
| KR | 10-2023-0048923 A | 4/2023 | | |

* cited by examiner

*Primary Examiner* — Amanda C. Walke
(74) *Attorney, Agent, or Firm* — Fox Rothschild LLP

(57) ABSTRACT

Disclosed is a fuel cell system and a method for controlling the same which in a constant current operation mode in which an output current of a fuel cell stack is constant, controls a hydrogen supply unit, an air supply unit, or a hydrogen recirculation unit differently depending on the size of a target output current to prevent the local flooding of the fuel cell stack in the constant current operation mode.

14 Claims, 12 Drawing Sheets

FUEL CELL SYSTEM AND METHOD FOR CONTROLLING THE SAME

CROSS REFERENCE TO RELATED APPLICATION

The present application is based on and claims the benefit of Korean Patent Application No. 10-2021-0157743, filed Nov. 16, 2021, the entire contents of which is incorporated herein for all purposes by this reference.

TECHNICAL FIELD

Embodiments of the present disclosure relate to a fuel cell system and a method for controlling the same which in a constant current operation mode in which an output current of a fuel cell stack is constant, controls a hydrogen supply unit, an air supply unit, or a hydrogen recirculation unit differently depending on the size of a target output current to prevent the local flooding of the fuel cell stack in the constant current operation mode.

DESCRIPTION OF THE RELATED ART

In general, a fuel cell is a device that receives hydrogen and air from the outside and generates electrical energy through an electrochemical reaction inside a fuel cell stack and includes a membrane-electrode assembly (MEA).

In the membrane electrode assembly, a fuel electrode (anode) to which hydrogen is supplied and an air electrode (cathode) to which air is supplied are arranged on both sides with a solid polymer electrolyte membrane through which hydrogen ions are transmitted. The fuel electrode includes a catalyst layer coated with a catalyst so that hydrogen and oxygen can react, and a gas diffusion layer is disposed outside the air electrode. A stack of such a membrane electrode assembly and a separator in sequence is called a fuel cell stack.

When a fuel cell system operates, hydrogen and oxygen react in the fuel cell stack to generate water. The water (condensate) generated at this time reduces the active surface area of the catalyst layer and causes a loss in the electrode reaction and increases a mass transfer resistance to cause a voltage drop, so that there is a problem of deteriorating the performance of the fuel cell.

On the other hand, since water acts as a transport medium for hydrogen ions in a fuel cell, it is necessary to contain moisture properly for the operation of the fuel cell.

That is, not only in the case of the so-called flooding phenomenon in which the condensate overflows, but also in the case of a dry-out phenomenon in which the condensate is too insufficient, the performance of the fuel cell deteriorates, and thus, the condensate generated in the fuel cell needs to be appropriately controlled.

In order to solve this problem, a method for forming a gas flow inside the fuel cell stack by, for example, injecting air into the fuel cell stack or generating a pressure difference between the anode and the cathode, may be used, and there is a need for research on various control systems and control methods for this.

SUMMARY

A fuel cell system according to embodiments of the present disclosure includes a fuel cell stack that includes an anode to which hydrogen is supplied, a cathode to which air is supplied, and a membrane electrode assembly (MEA) between the anode and the cathode; a hydrogen supply unit that is configured to supply hydrogen to the anode of the fuel cell stack; an air supply unit that is configured to supply air to the cathode of the fuel cell stack; a hydrogen recirculation unit that is connected to the anode of the fuel cell stack to recirculate discharged hydrogen from an outlet to an inlet; and a control unit that in a constant current operation mode in which an output current of the fuel cell stack is constant, controls the hydrogen supply unit, the air supply unit, or the hydrogen recirculation unit differently depending on a size of a target output current to prevent local flooding of the fuel cell stack in the constant current operation mode.

In the fuel cell system according to embodiments of the present disclosure, the control unit may select a current region corresponding to the target output current, and control the hydrogen supply unit, the air supply unit, or the hydrogen recirculation unit differently depending on the corresponding current region.

In the fuel cell system according to embodiments of the present disclosure, the control unit may measure a rate of change in an average cell voltage or a rate of change in a moisture content of an electrode membrane of the fuel cell stack depending on the size of the target output current, and control the hydrogen supply unit, the air supply unit, or the hydrogen recirculation unit differently depending on the measurement result.

The current region includes a high current region, a medium current region, and a low current region depending on the size of the target output current, and the control unit may control the hydrogen supply unit, the air supply unit, or the hydrogen recirculation unit differently depending on the current region corresponding to the target output current.

In the fuel cell system according to embodiments of the present disclosure, the control unit may control the air supply unit to increase a flow rate of air supplied to the cathode when the target output current corresponds to the high current region and the medium current region.

In the fuel cell system according to embodiments of the present disclosure, the control unit may control the hydrogen supply unit and the air supply unit to change a pressure difference of the hydrogen and air supplied to the anode and the cathode when the control of the system is impossible or a rapid cell leakage phenomenon occurs.

In the fuel cell system according to embodiments of the present disclosure, when the target output current is in the low current region, the control unit controls the hydrogen recirculation unit to change a recirculation ratio of the hydrogen discharged from an outlet of the anode.

In the fuel cell system according to embodiments of the present disclosure, the control unit may control the hydrogen supply unit to increase a flow rate of the hydrogen supplied to the anode when a rapid cell leakage phenomenon occurs.

In the fuel cell system according to embodiments of the present disclosure, the control unit may reexamine whether the output current changed according to the control result of the hydrogen supply unit, the air supply unit, or the hydrogen recirculation unit corresponds to the target output current.

A method for controlling a fuel cell system according to embodiments of the present disclosure includes the steps of operating the fuel cell stack in the constant current operation mode in which the output current is constant by the control unit, and preventing local flooding of the fuel cell stack in the constant current operation mode by controlling the hydrogen supply unit, the air supply unit, or the hydrogen recirculation unit differently depending on the size of the target output current by the control unit.

In the method for controlling the fuel cell system according to embodiments of the present disclosure, the step of operating in the constant current operation mode may include the steps of examining the output current of the fuel cell stack by the control unit and classifying whether the output current corresponds to a target output current range.

The method for controlling the fuel cell system according to embodiments of the present disclosure may further include the step of measuring a rate of change in an average cell voltage or a rate of change in a moisture content of an electrode film of the fuel cell stack depending on the size of the target output current by the control unit, after the step of operating in the constant current operation mode.

In the method for controlling the fuel cell system according to embodiments of the present disclosure, the step of preventing local flooding of the fuel cell stack may include the steps of controlling the hydrogen recirculation unit to change a recirculation ratio of the hydrogen discharged from an outlet of the anode by the control unit and controlling the hydrogen supply unit to increase a flow rate of the hydrogen supplied to the anode by the control unit. Here, each step may be performed only when the target output current corresponds to a low current region.

In the method for controlling the fuel cell system according to embodiments of the present disclosure, the step of preventing local flooding of the fuel cell stack may include the steps of controlling the air supply unit to increase a flow rate of the air supplied to the cathode by the control unit and controlling the hydrogen supply unit and the air supply unit to change a pressure difference of the hydrogen and air supplied to the anode and the cathode by the control unit. Here, each step may be performed only when the target output current corresponds to a high current region or a medium current region.

The method for controlling the fuel cell system according to embodiments of the present disclosure may further include, after the step of preventing local flooding of the fuel cell stack, the step of reexamining whether the output current changed depending on the control result of the hydrogen supply unit, the air supply unit, or the hydrogen recirculation unit by the control unit corresponds to the target output current.

According to the fuel cell system and the method for controlling the same according to the embodiments of present disclosure, in a constant current operation mode in which an output current of a fuel cell stack is constant, a hydrogen supply unit, an air supply unit, or a hydrogen recirculation unit is controlled differently depending on the size of a target output current, so that it is possible to prevent the local flooding of the fuel cell stack in the constant current operation mode.

As discussed, the method and apparatus suitably include use of a controller or processor.

In another embodiment, vehicles are provided that comprise an apparatus as disclosed herein.

DETAILED DESCRIPTION

Figure 1:
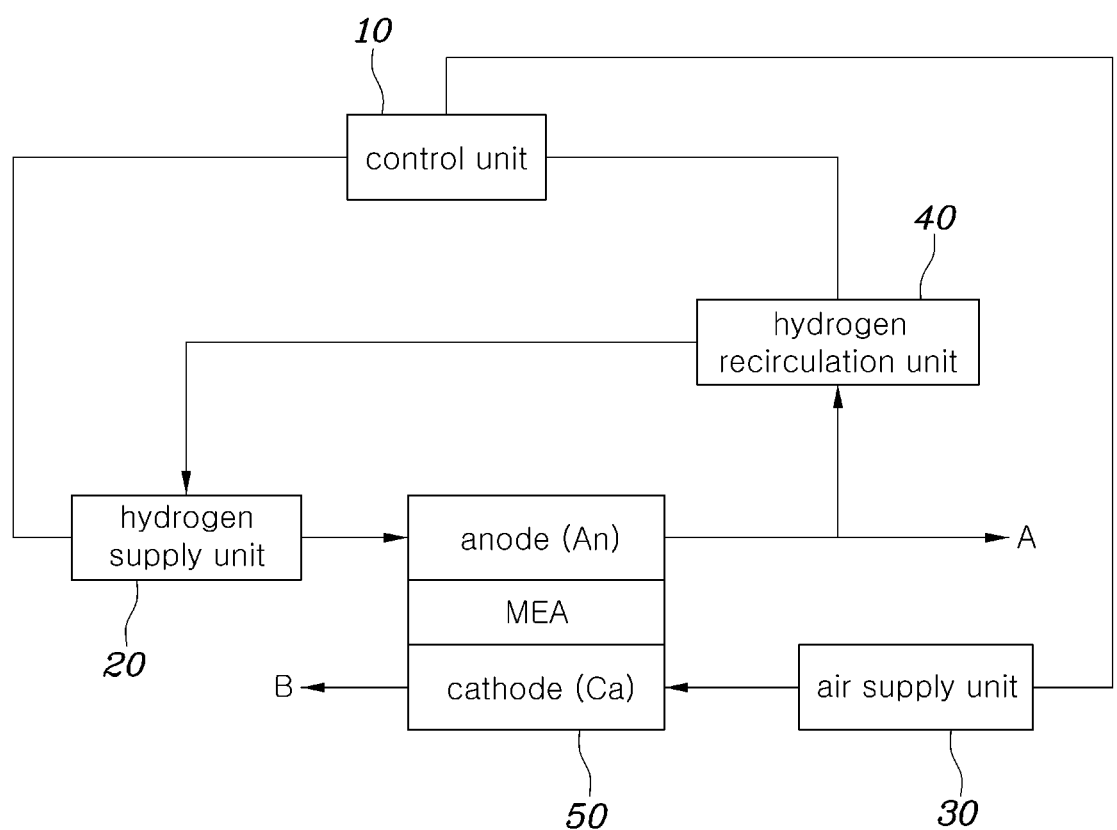
FIG. 1 is a configuration view of a fuel cell system according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Further, the control logic of embodiments of the present disclosure may be embodied as non-transitory computer readable media on a computer readable medium containing executable program instructions executed by a processor, controller, or the like. Examples of computer readable media include, but are not limited to, ROM, RAM, compact disc (CD)-ROMs, magnetic tapes, floppy disks, flash drives, smart cards, and optical data storage devices. The computer readable medium can also be distributed in network coupled computer systems so that the computer readable media is stored and executed in a distributed fashion, e.g., by a telematics server or a Controller Area Network (CAN).

Throughout this specification, when a part "includes" a certain component, it means that other components may be further included, rather than excluding other components, unless otherwise stated.

Hereinafter, the configuration and operating principle of various embodiments of the present disclosure will be described in detail with reference to the accompanying drawings.

FIG. 1 is a configuration view of a fuel cell system according to an embodiment of the present disclosure.

Referring to FIG. 1, the fuel cell system according to embodiments of the present disclosure may include a fuel cell stack 50 that may be configured to include an anode to which hydrogen is supplied, a cathode to which air is supplied, and a membrane electrode assembly (MEA) between the anode and the cathode; a hydrogen supply unit 20 that may supply hydrogen to the anode of the fuel cell stack 50; an air supply unit 30 that may supply air to the cathode of the fuel cell stack 50; a hydrogen recirculation unit 40 that may be connected to the anode of the fuel cell stack 50 to recirculate the discharged hydrogen from an outlet to an inlet; and a control unit 10 that in a constant current operation mode in which the output current of the fuel cell stack 50 may be constant and control the hydrogen supply unit 20, the air supply unit 30, or the hydrogen recirculation unit 40 differently depending on the size of a target output current to prevent local flooding of the fuel cell stack 50 in the constant current operation mode.

The control unit 10 according to an exemplary embodiment of the present disclosure may be implemented through a non-volatile memory (not shown) configured to store an algorithm configured to control the operation of various components of a vehicle or the data relating to software instructions for reproducing the algorithm, and a processor (not shown) configured to perform operations described below using the data stored in the corresponding memory. Here, the memory and the processor may be implemented as separate chips. Alternatively, the memory and processor may be implemented as a single chip integrated with each other, and the processor may take the form of one or more processors.

As seen in the background art, a fuel cell stack 50 generally includes a membrane electrode assembly, and on both sides of the membrane electrode assembly, an anode (An) to which hydrogen is supplied and a cathode (Ca) to which air is supplied are arranged.

The fuel cell system including the fuel cell stack 50 may require the hydrogen supply unit 20 that supplies hydrogen to the anode of the fuel cell stack 50 and the air supply unit 30 that supplies air to the cathode of the fuel cell stack 50, and the fuel cell system according to embodiments of the present disclosure further may include the hydrogen recirculation unit 40 that recirculates the hydrogen (unreacted hydrogen) discharged to the outlet without reacting among the hydrogen supplied to the anode to the inlet.

Specifically, the hydrogen supplied to the anode from the hydrogen supply unit 20 may be discharged in the A direction after reaction with air, and at this time, the nitrogen contained in the air is discharged together with unreacted hydrogen. In addition, the air supplied to the cathode from the air supply unit 30 may be discharged in the B direction after reaction with hydrogen. The air supply unit 30 may be configured to include an intake system, an air compressor, and a humidifier.

On the other hand, when the fuel cell system operates, a flooding phenomenon in which the condensate overflows in the fuel cell stack 50 and a dry-out phenomenon in which the condensate is insufficient may be compatible.

Accordingly, in order to solve this problem, the fuel cell system according to embodiments of the present disclosure further includes the control unit 10 that may control the hydrogen supply unit 20 and the air supply unit 30 to adjust the flow rate or pressure difference of the supplied hydrogen and air, or control the hydrogen recirculation unit 40 to change the concentration of hydrogen to be recirculated through a change in the recirculation rate of hydrogen recirculated to the anode.

When the recirculation ratio of the hydrogen and the flow rate and pressure difference of the supplied hydrogen and air are changed, a gas flow is formed inside the fuel cell stack, so the condensate inside the fuel cell stack can be effectively discharged through the gas flow thus formed.

Hereinafter, with reference to FIGS. 2 to 12, the configuration and operating principle of the present disclosure will be described in detail.

Figure 2:
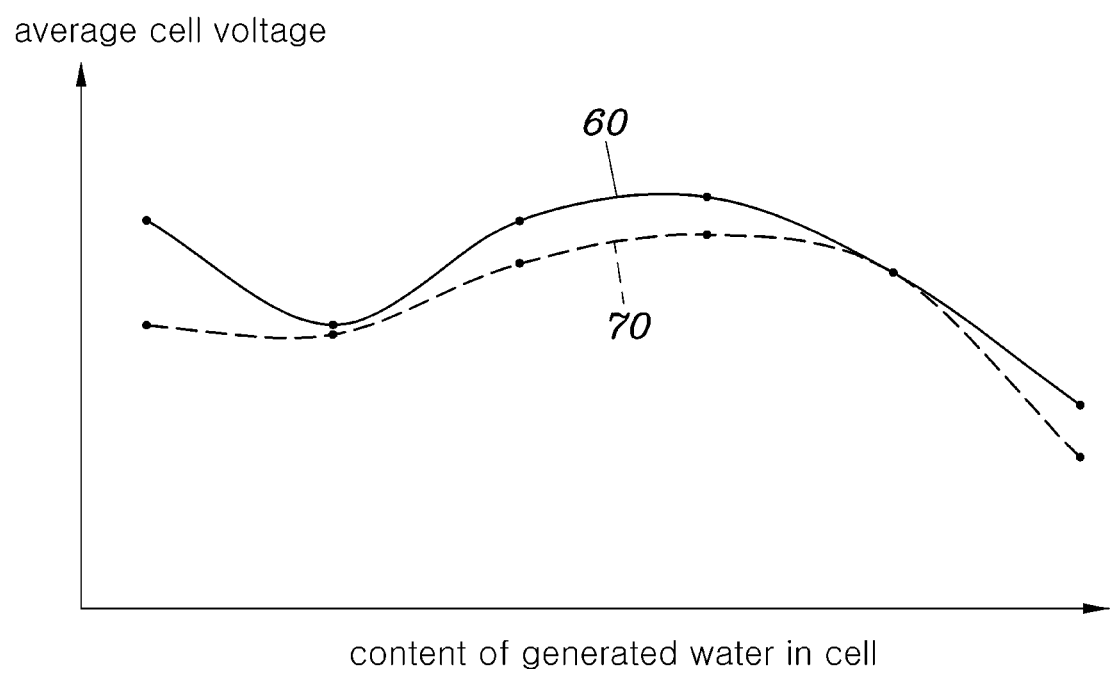
FIG. 2 is a graph showing a change in performance in a low current operation mode of a fuel cell system according to an embodiment of the present disclosure.
Figure 3:
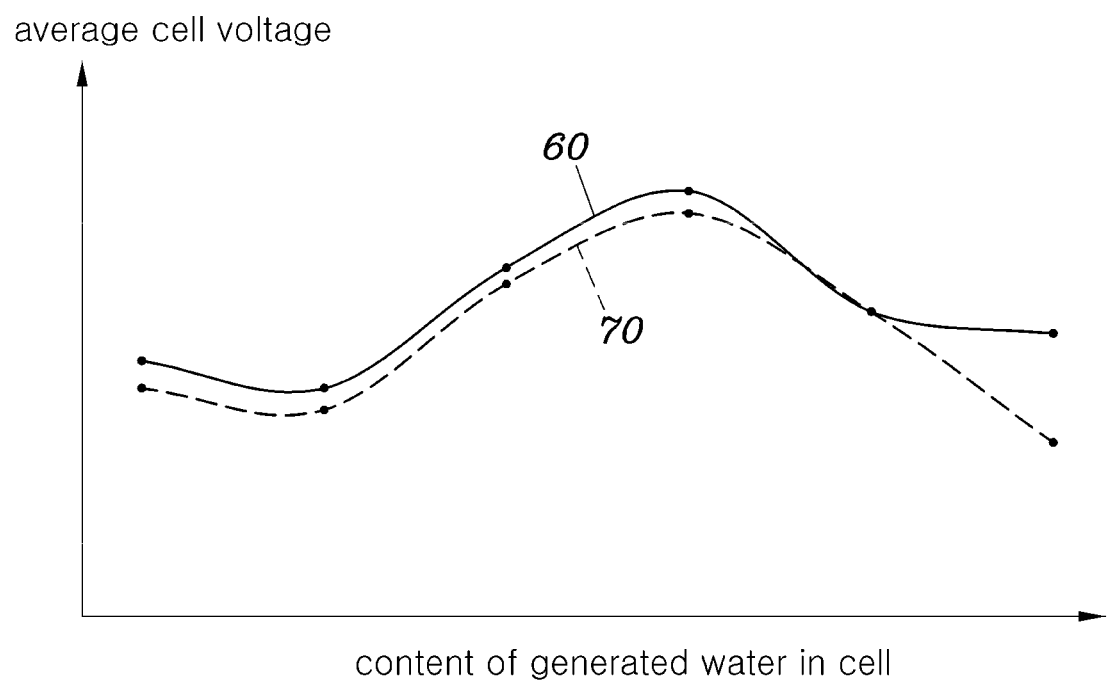
FIG. 3 is a graph showing a change in performance in a medium current operation mode of a fuel cell system according to an embodiment of the present disclosure.
Figure 4:
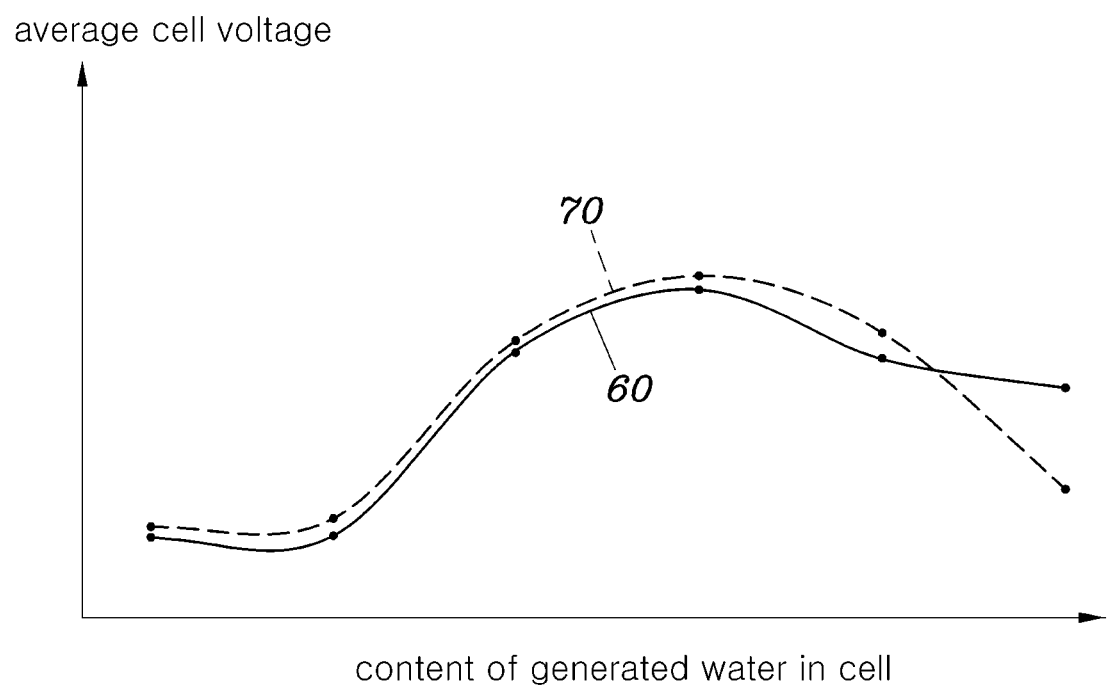
FIG. 4 is a graph showing a change in performance in a high current operation mode of a fuel cell system according to the embodiment of the present disclosure.
Figure 5:
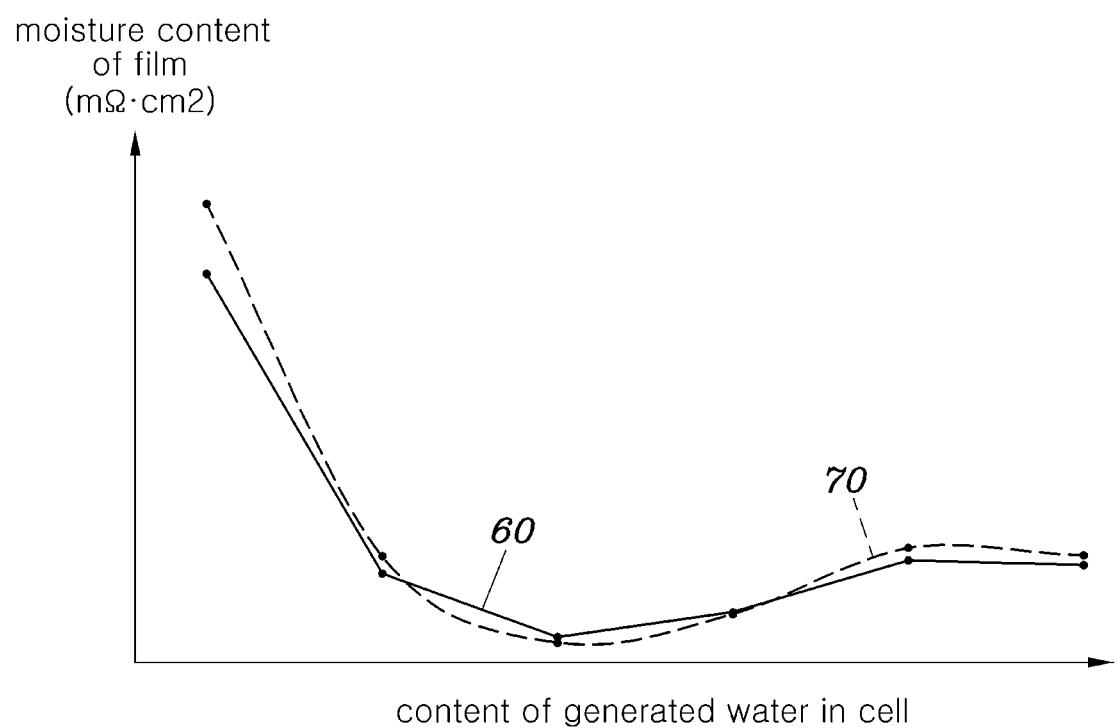
FIG. 5 is a graph showing a change in a moisture content of an electrode film in a low current operation mode of a fuel cell system according to the embodiment of the present disclosure.
Figure 6:
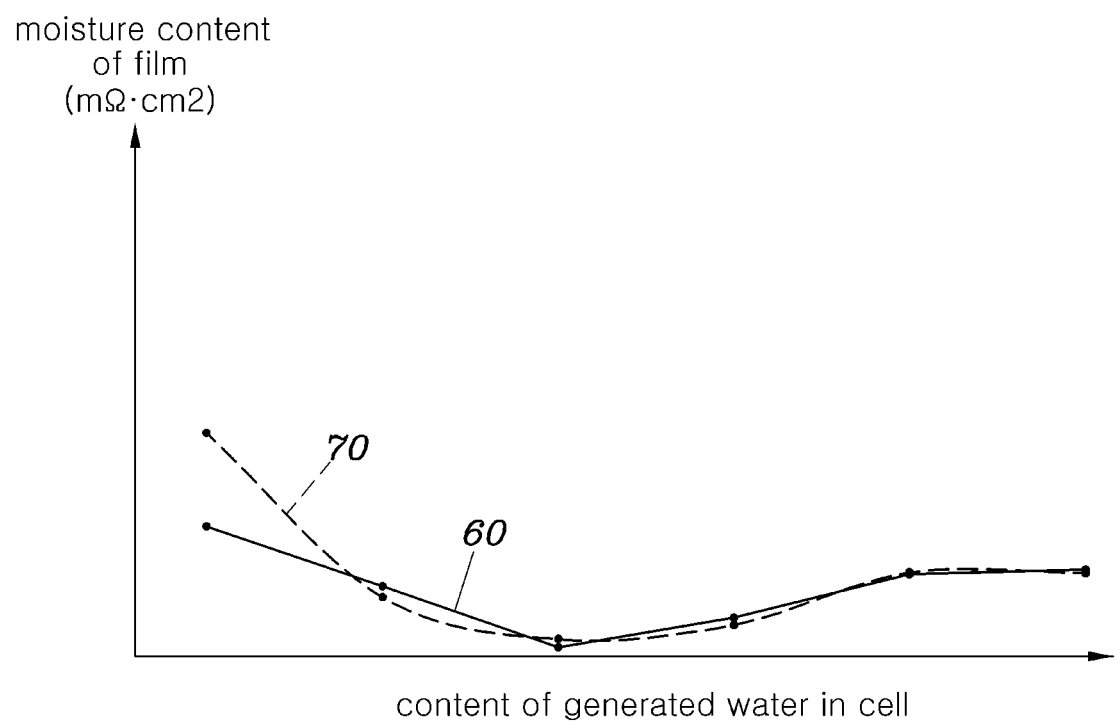
FIG. 6 is a graph showing a change in a moisture content of an electrode film in a medium current operation mode of a fuel cell system according to the embodiment of the present disclosure.
Figure 7:
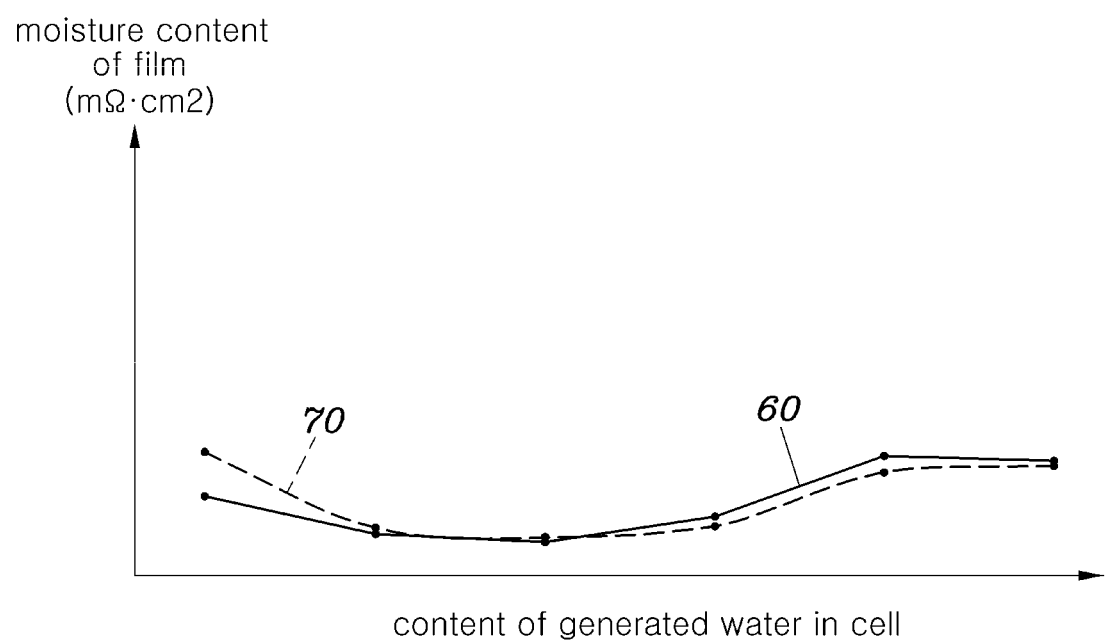
FIG. 7 is a graph showing a change in a moisture content of an electrode film in a high current operation mode of a fuel cell system according to the embodiment of the present disclosure.

FIG. 2 is a graph showing a change in performance in a low current operation mode of a fuel cell system according to an embodiment of the present disclosure; FIG. 3 is a graph showing a change in performance in a medium current operation mode of a fuel cell system according to an embodiment of the present disclosure; FIG. 4 is a graph showing a change in performance in a high current operation mode of a fuel cell system according to the embodiment of the present disclosure; FIG. 5 is a graph showing a change in a moisture content of an electrode film in a low current operation mode of a fuel cell system according to the embodiment of the present disclosure; FIG. 6 is a graph showing a change in a moisture content of an electrode film in a medium current operation mode of a fuel cell system according to the embodiment of the present disclosure; and FIG. 7 is a graph showing a change in a moisture content of an electrode film in a high current operation mode of a fuel cell system according to the embodiment of the present disclosure.

In FIGS. 2 to 7, the low current operation mode, the medium current operation mode, and the high current operation mode mean the output current in the constant current operation mode, respectively. In each figure, the horizontal axis represents the content of condensate (generated water) in a cell, the solid line represents the condition of an initial voltage 60, and the dotted line represents the condition of a later voltage 70 when the constant current operation mode is maintained for 30 minutes.

The vertical axis in FIGS. 2 to 4 represents an average cell voltage, and when the later voltage 70 decreases compared to the initial voltage 60, it means that the performance of the fuel cell stack 50 may be deteriorated.

That is, referring to FIGS. 2 and 3, it can be seen that if the condensate in the cell is insufficient or excessive in the low and medium current operation modes, the average cell voltage is decreased, and thus the performance of the fuel cell stack 50 may be deteriorated. In particular, if the condensate in the cell is insufficient, the performance degradation in the low current range is severe.

Referring to FIG. 4, if the condensate in the cell is excessive in the high current operation mode, the performance of the fuel cell stack 50 may be deteriorated. However, if the condensate in the cell is insufficient in the high current operation mode, temporary performance increase effect occurs due to the catalyst stimulation and the occurrence of the generated water. That is, in the high current operation mode, it can be understood that performance degradation starts when the condensate in the cell is excessive.

As described above, since the degree of performance deterioration of the fuel cell stack 50 is different depending on an output current in the constant current operation mode, the control unit 10 of the fuel cell system according to embodiments of the present disclosure may select the current region corresponding to a target output current, and control the hydrogen supply unit 20, the air supply unit 30, or the hydrogen recirculation unit 40 differently depending on the corresponding current region.

In this case, the current region includes a high current region, a medium current region, and a low current region depending on the size of the target output current, and the control unit 10 may control the hydrogen supply unit 20, the air supply unit 30 or the hydrogen recirculation unit 40 differently depending on the current region of the target output current.

For reference, here, the target output current means a reference cunent value for classifying the output current into a low current, aa medium current, or a high current.

Control of the hydrogen supply unit 20, the air supply unit 30 or the hydrogen recirculation unit 40 by the control unit 10 will be described in detail later with reference to FIGS. 7 and 8.

On the other hand, the control unit 10 of the fuel cell system according to embodiments of the present disclosure may measure the rate of change in the average cell voltage or the rate of change in the moisture content of the electrode membrane of the fuel cell stack depending on the size of the target output current, and may control the hydrogen supply unit 20, the air supply unit 30, or the hydrogen recirculation unit 40 differently according to the measurement result.

Referring to FIGS. 5 to 7, it is possible to determine the degree of a gas flow in the fuel cell stack 50 through the rate of change in the moisture content of the electrode film.

Specifically, in FIGS. 5 to 7, the low current operation mode, the medium current operation mode, and the high current operation modes mean the output current in the constant current operation mode, respectively, and in each figure, the horizontal axis represents the content of condensate (generated water) in the cell, and the solid line represents the condition of the initial voltage 60, and the dotted line represents the condition of the later voltage 70 when the constant current operation mode is maintained for 30 minutes.

The vertical axis in FIGS. 5 to 7 represents the moisture content of the electrode film inside the fuel cell stack 50, and the degree of change in the moisture content of the electrode film at the initial voltage 60 and the degree of change in the moisture content of the electrode film at the later voltage 70 can be seen. If the degree of change is large, the gas flow in the fuel cell stack 50 may be viewed to be large, and if the degree of change is small, the gas flow may be viewed to be small.

That is, if the gas flow is small, it can be understood that the discharge efficiency of the condensate in the cell is reduced. Therefore, the control by the control unit 10 may be required in this case to increase the discharge efficiency of the condensate.

On the other hand, the reference for determining the degree of the gas flow in the fuel cell stack 50 depending on the degree of change in the moisture content of the electrode film may be an error range set by the data values derived through various experiments in advance, and this error range may be stored in the memory of the control unit 10 and provided as the reference for the determination.

As a result, the control twit 10 may use the data values of the error range stored in the memory to determine that the gas flow is large if the moisture content of the electrode film is out of the error range, and the gas flow is small if the moisture content of the electrode film falls within the error range, and controls the hydrogen supply unit 20, the air supply unit 30, or the hydrogen recirculation unit 40 differently to increase the discharge efficiency of the condensate.

Hereinafter, with reference to FIGS. 8 and 9, the control of the hydrogen supply unit 20, the air supply unit 30, or the hydrogen recirculation unit 40 by the control unit 10 will be described in detail.

Figure 8:
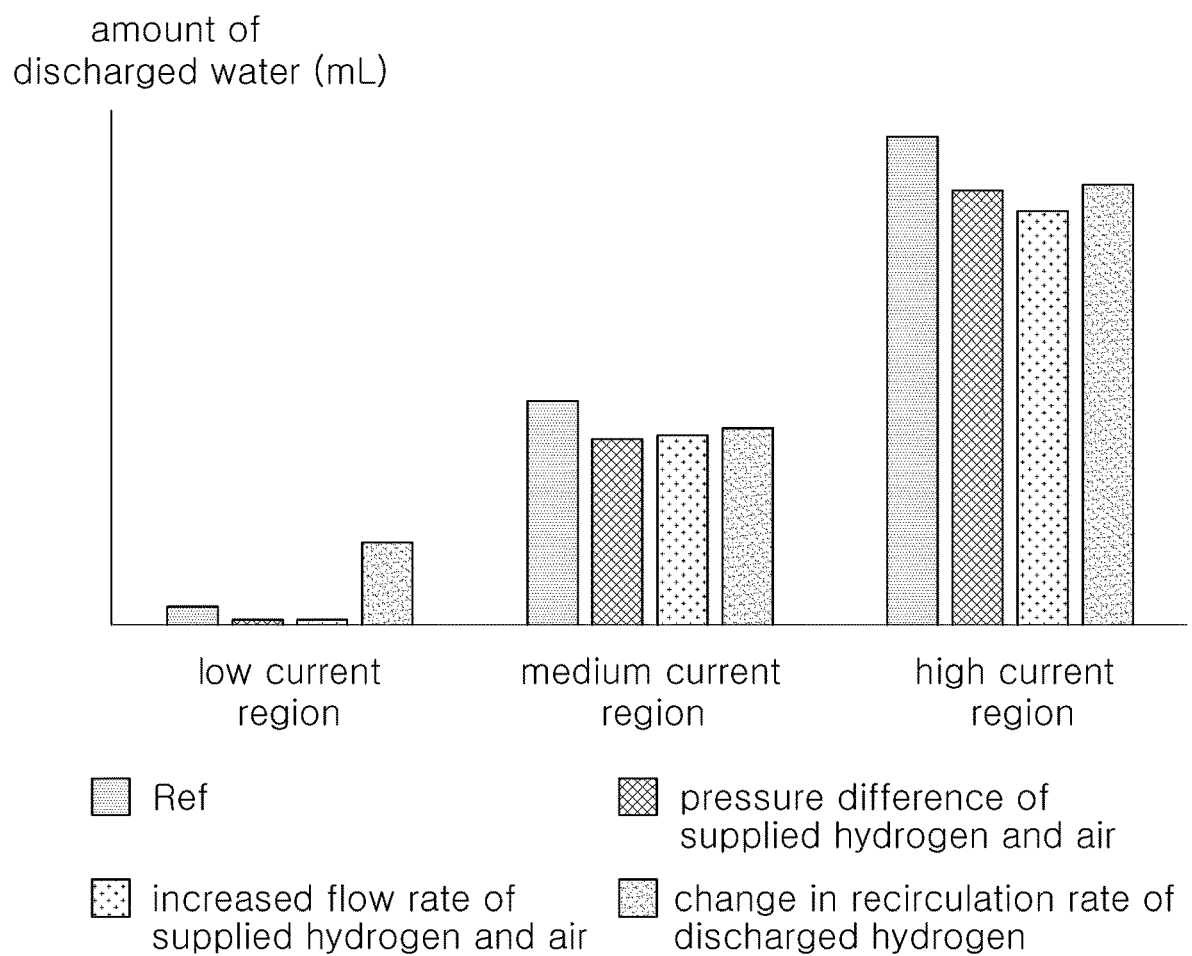
FIG. 8 is a graph showing an amount of water discharged from an anode by an output current depending on an operation mode of a fuel cell system according to an embodiment of the present disclosure.
Figure 9:
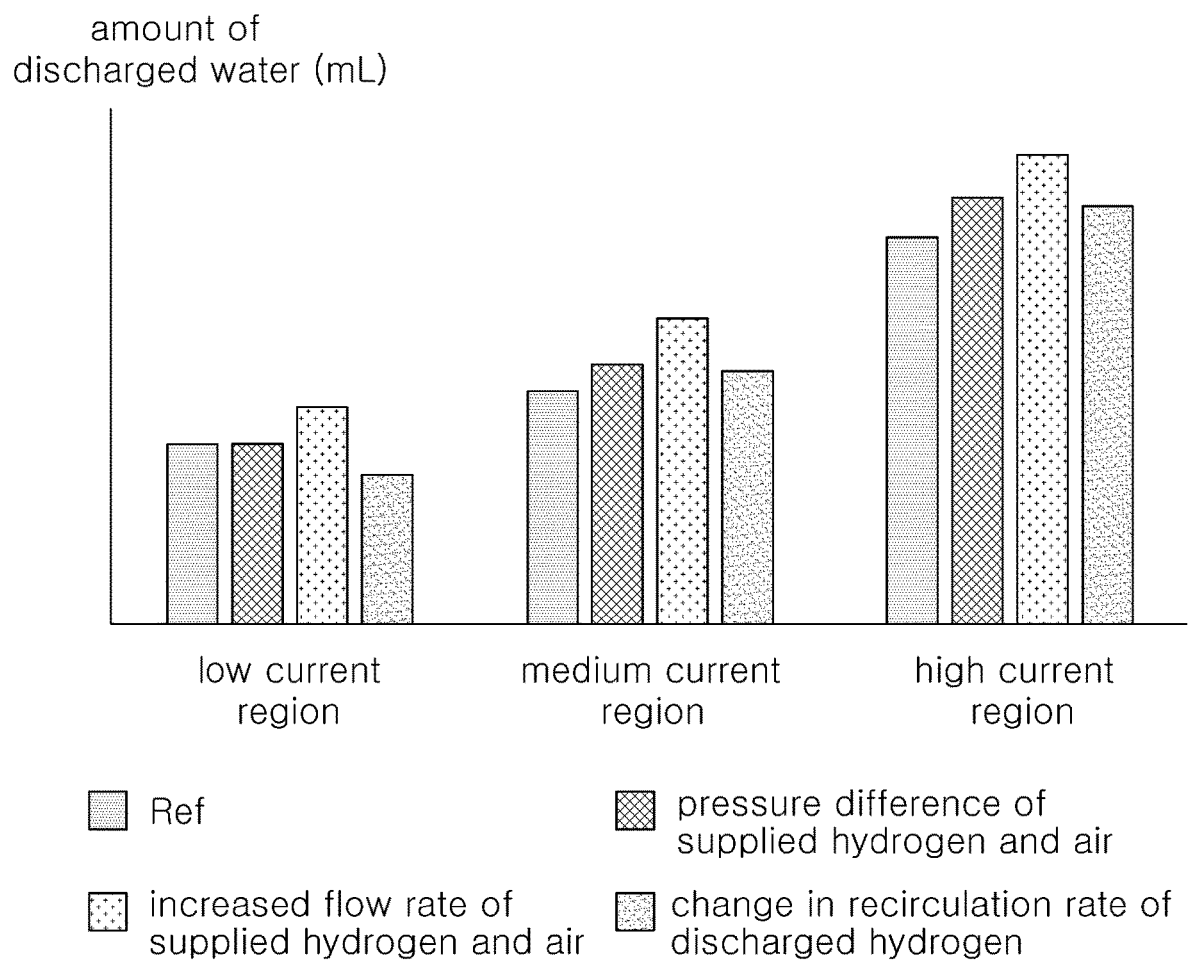
FIG. 9 is a graph showing an amount of water discharged from a cathode by an output current depending on an operation mode of a fuel cell system according to an embodiment of the present disclosure.

FIG. 8 is a graph showing an amount of water discharged from an anode by an output current depending on an operation mode of a fuel cell system according to an embodiment of the present disclosure, and FIG. 9 is a graph showing an amount of water discharged from a cathode by an output current depending on an operation mode of a fuel cell system according to an embodiment of the present disclosure.

FIGS. 8 and 9 show an output current for each operation mode in the case of a comparison group (Ref) when no control is performed by the control unit 10, in the case in which the control unit 10 controls the hydrogen supply unit 20 and the air supply unit 30 to provide a change in a pressure difference of the supplied hydrogen and air, in the case in which the control unit 10 controls the hydrogen supply unit 20 to increase the flow rate of supplied hydrogen or controls the air supply unit 30 to increase the flow rate of supplied air, and in the case in which the control unit 10 controls the hydrogen recirculation unit 40 to change the recirculation ratio of the discharged hydrogen. FIG. 8 means the amount of the condensate discharged from the anode, and FIG. 9 means the amount of the condensate discharged from the cathode.

Referring to FIG. 8, the rate of the condensate discharged from the anode is the highest when the recirculation ratio of discharged hydrogen is changed in all operation modes of low current, medium current, and high current. That is, it can be seen that the discharge efficiency of the condensate at the anode to which hydrogen is supplied is most effective when the recirculation ratio of the discharged hydrogen is changed.

Referring to FIG. 9, the rate of the condensate discharged from the cathode is the highest when the flow rate of supplied hydrogen and air is increased in all operation modes of low current, medium current, and high current. That is, it can be seen that the discharge efficiency of the condensate at the cathode to which air is supplied is most effective when the flow rate of supplied hydrogen and air is increased.

Accordingly, the control unit 10 of the fuel cell system according to embodiments of the present disclosure may control the air supply unit 30 to increase the flow rate of the air supplied to the cathode when the target output current corresponds to the high and medium current regions.

That is, as the most effective method for discharging the condensate from the cathode, the control unit 10 controls the air supply unit 30 to increase the flow rate of the air supplied to the cathode, thereby preventing the flooding phenomenon due to the accumulation of the condensate in the fuel cell stack 50.

On the other hand, when the control of the system is impossible or when a rapid cell leakage occurs, the control unit 10 of the fuel cell system according to embodiments of the present disclosure may control the hydrogen supply unit 20 and the air supply unit 30 to change the pressure difference of the hydrogen and air supplied to the anode and the cathode.

Here, the rapid cell leakage phenomenon means that the cell performance is deteriorated due to the flooding. That is, when the raid cell leakage phenomenon occurs, the flooding phenomenon has already occurred, and the condensate in the fuel cell stack 50 must be discharged as quickly as possible.

In addition, the case in which the control of the system is impossible means a case in which the flow rate of the hydrogen or air is out of the reference range of the system, and thus the flow rate of supplied hydrogen and air cannot be increased anymore.

Therefore, when the control of the system is impossible or the rapid cell leakage phenomenon occurs, another method is required for discharging the condensate. Accordingly, referring to FIG. 9 showing an amount of the condensate discharged from the cathode, the most effective case for discharging the condensate is to increase the flow rate of the supplied hydrogen and air, and the next effective case is to change the pressure difference of the supplied hydrogen and air.

In the case of changing the pressure difference of the supplied hydrogen and air, the larger the difference between the pressures, the faster the condensate inside the fuel cell stack 50 can be discharged, so that it is possible to respond to the rapid cell leakage phenomenon. In addition, when it is no longer possible to increase the flow rate of supplied hydrogen and air, the next effective method next to the method of increasing the flow rate of the supplied hydrogen and air is to change the pressure difference of the supplied hydrogen and air. Thus, this method can effectively respond to the prevention of local flooding.

On the other hand, the control unit of the fuel cell system according to embodiments of the present disclosure may control the hydrogen recirculation unit 40 to change the recirculation ratio of the hydrogen discharged from the outlet of the anode when the target output current is in the low current region.

As seen above, referring to FIG. 8, the amount of the condensate discharged from the anode is the highest when the recirculation ratio of discharged hydrogen is changed in all operation modes of low current, medium current, and high current. That is, it can be seen that the discharge efficiency of the condensate at the anode to which hydrogen is supplied is most effective when the recirculation ratio of discharged hydrogen is changed.

Therefore, when the target output current is in the low current region, the control unit 10 of the fuel cell system according to embodiments of the present disclosure prevents the flooding phenomenon due to the accumulation of the condensate in the fuel cell stack 50 by controlling the hydrogen recirculation unit 40 to change the recirculation ratio of the hydrogen discharged from the outlet of the anode, which is the most effective method in discharging the condensate.

For reference, here, an ejector and the like may be utilized as the hydrogen recirculation unit 40, and by changing the purge cycle of the ejector, it is possible to change the recirculation ratio of the discharged hydrogen.

Specifically, if the purge cycle of the ejector is increased, unreacted discharged hydrogen is more frequently supplied to the inlet of the anode, so that the hydrogen concentration in the fuel cell stack 50 increases. Conversely, if the purge cycle of the ejector is reduced, relatively less unreacted discharged hydrogen is supplied to the inlet of the anode, and thus the hydrogen concentration in the fuel cell stack 50 is reduced. As the hydrogen concentration in the fuel cell stack 50 changes, the flow according to the change in the concentration of hydrogen gas occurs in the fuel cell stack 50, and thus the discharge efficiency of the local condensate is improved.

On the other hand, the control unit 10 of the fuel cell system according to embodiments of the present disclosure may control the hydrogen supply unit 20 to increase the flow rate of the hydrogen supplied to the anode when the rapid cell leakage phenomenon occurs.

Here, the rapid cell leakage phenomenon means that the cell performance is deteriorated due to the flooding, as described above. That is, when the rapid cell leakage phenomenon occurs, the flooding phenomenon has already occurred, and the condensate in the fuel cell stack 50 must be discharged as quickly as possible.

Therefore, when the rapid cell leakage phenomenon occurs, another method is required for discharging the condensate. Accordingly, referring to FIG. 8 showing an amount of the condensate discharged from the anode, the effect of discharging condensate is high when the recirculation ratio of the discharged hydrogen is changed, followed by the case when the flow rate of the supplied hydrogen and air is increased and the case when the pressure difference of the supplied hydrogen and air is changed. But it can be seen that there is no significant difference in the effect between the latter two cases and they are similar.

That is, in this case, it does not matter whether the flow rate of the supplied hydrogen and air is increased or the pressure difference of the supplied hydrogen and air is changed. However, in the method of changing the pressure difference of the supplied hydrogen and air, both the hydrogen supply unit 20 and the air supply unit 30 must be controlled, whereas in the case of increasing the flow rate of the supplied hydrogen and air, either of the hydrogen supply unit 20 or the air supply unit 30 must be controlled, and thus, power consumption by the control of the control unit 10 is saved, and there is an advantageous effect in terms of durability of the hydrogen supply unit 20 and the air supply unit 30.

Furthermore, compared to a case in which the concentration of the hydrogen gas is changed due to the recirculation of the discharged hydrogen, which is an indirect method, a case in which the flow rate of the supplied hydrogen is increased by the hydrogen supply unit 20, which is a direct method, can discharge the condensate in the fuel cell stack 50 more quickly, and thus can respond to the rapid cell leakage phenomenon.

The control unit 10 of the fuel cell system according to embodiments of the present disclosure may reexamine whether the output current changed according to the control result of the hydrogen supply unit 20, the air supply unit 30, or the hydrogen recirculation unit 40 corresponds to the target output current.

Here, the target output current means a reference current value for classifying the output current into a low current, a medium current, or a high current, as described above.

The control unit 10 may remeasure the output current changed by the control of the hydrogen supply unit 20, the air supply unit 30, or the hydrogen recirculation unit 40.

In this case, when an existing output current corresponds to the low current mode, based on an upper limit of the reference current value classified in the low current mode, if the changed output current is a value lower than the upper limit value, the control unit 10 may continue to maintain the system control for flooding prevention, and if the changed output current is a value higher than the upper limit value, the control unit 10 may terminate without further controlling the hydrogen supply unit 20, the air supply unit 30, or the hydrogen recirculation unit 40.

For reference, if the changed output current exceeds the upper limit of the reference current value classified in the low current mode, the changed output current may correspond to the medium current mode or the high current mode. In this case, the control unit 10 may terminate the control in the existing low current mode and selects a current region corresponding to the target output current again and, if it corresponds to the medium current mode or the high current mode, the control unit 10 may need to renew the control according to the corresponding operation mode.

Accordingly, when the existing output current corresponds to the medium current mode, based on the upper limit of the reference current value classified in the medium current mode, if the changed output current is lower than the upper limit value, the control unit 10 may continue to maintain the system control for the flooding prevention, and if the changed output current is higher than the upper limit value, the control unit 10 may terminate without further control of the hydrogen supply unit 20, the air supply unit 30, or the hydrogen recirculation unit 40.

Even in this case, if the changed output current exceeds the upper limit of the reference current value classified in the medium current mode, the changed output current may correspond to the high current mode, and the control unit 10 has to renew the control according to the high current mode as described above.

When the existing output current corresponds to the high current mode, based on the upper limit of the reference current value classified in the high current mode, if the changed output current is lower than the upper limit value, the control unit 10 may continue to maintain the system control for the flooding prevention. If the changed output current is a value higher than the upper limit value, the control unit 10 may terminate without further controlling the hydrogen supply unit 20, the air supply unit 30, or the hydrogen recirculation unit 40.

Figure 10:
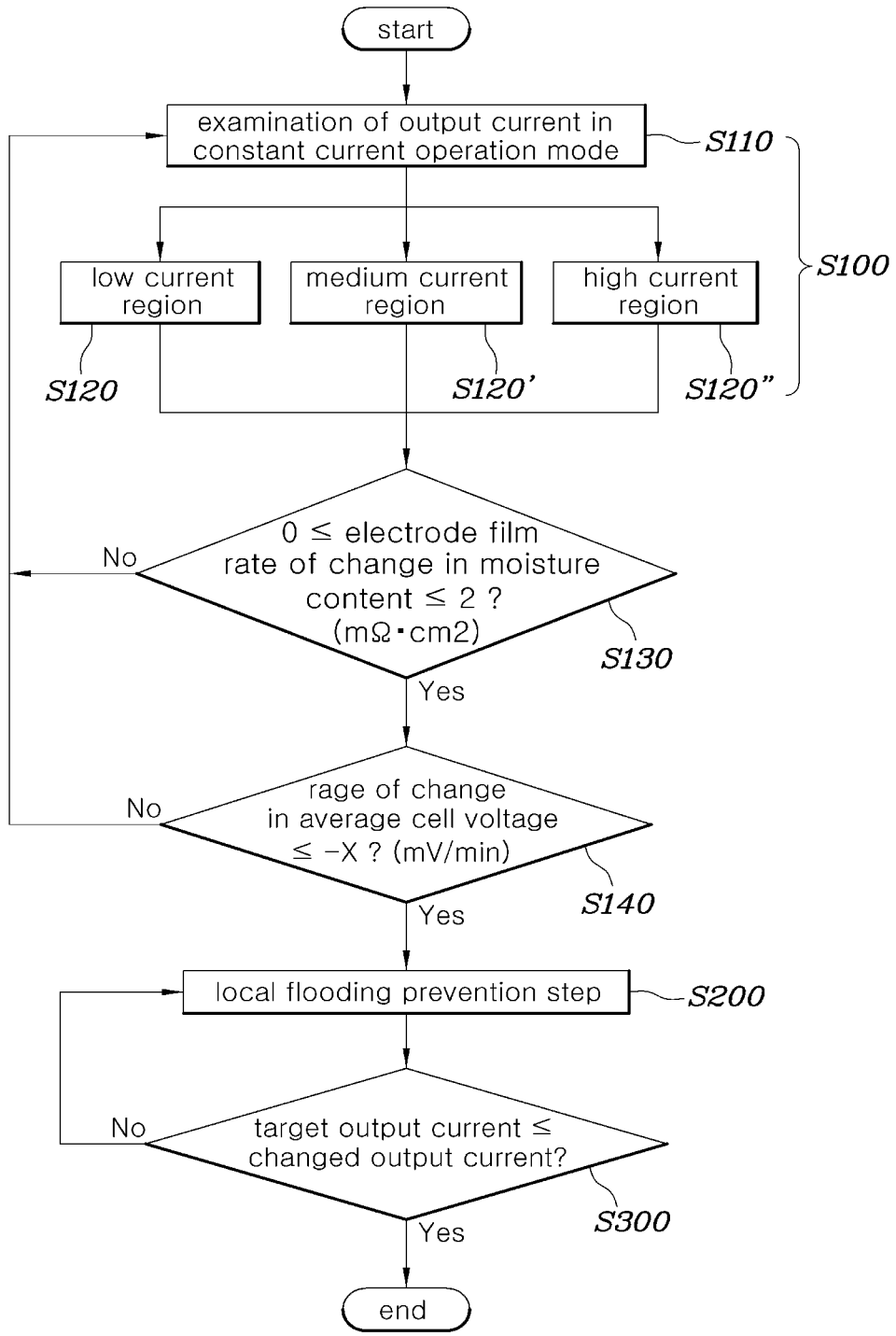
FIG. 10 is a flowchart of a method for controlling a fuel cell system according to an embodiment of the present disclosure.

FIG. 10 is a flowchart of a method for controlling a fuel cell system according to an embodiment of the present disclosure.

Referring to FIG. 10, the method for controlling a fuel cell system according to embodiments of the present disclosure includes the steps of operating the fuel cell stack in the constant current operation mode in which the output current is maintained constant by the control unit (S100) and preventing the local flooding of the fuel cell stack in the constant current operation mode by controlling the hydrogen supply unit, the air supply unit, or the hydrogen recirculation unit differently depending on the size of the target output current by the control unit (S200).

In addition, in the method for controlling the fuel cell system according to embodiments of the present disclosure, the step of operating in the constant current operation mode (S100) may include the steps of examining the output current of the fuel cell stack by the control unit (S110) and classifying whether the output current corresponds to the target output current region (S120, S120', S120").

Here, the target output current means the reference current value for classifying the output current in a low current, a medium current, or a high current, as described above.

That is, during the operation of the fuel cell, the control unit 10 may examine the output current of the fuel cell stack 50 and compares it with the target output current, thereby determining the current output current region of the fuel cell stack 50 and is to prevent the local flooding of the fuel cell stack 50 by applying a different control method depending on the determined target output current region.

On the other hand, after the step of operating in the constant current operation mode (S100), the method for controlling the fuel cell system according to embodiments of the present disclosure may further include the steps of measuring the rate of change in the average cell voltage or the rate of change in the moisture content of the electrode film of the fuel cell stack depending on the size of the target output current by the control unit (S130, S140).

As shown in FIGS. 2 to 7, the performance degradation of the fuel cell stack 50 may be determined from the rate of change in the average cell voltage of the fuel cell stack 50, and the degree of the gas flow in the fuel cell stack 50 may be determined through the rate of the change in the moisture content of the electrode film.

That is, the method for controlling the fuel cell system according to embodiments of the present disclosure measures the rate of change in the average cell voltage or the rate of change in the moisture content of the electrode film of the fuel cell stack 50 depending on the size of the target output current and determines whether to implement the control method for discharging the condensate in the fuel cell stack 50 depending on the measurement result.

For reference, in FIG. 10, the reference value of the rate of change in the average cell voltage is expressed as a negative number. Since the rate of change in a voltage refers to a value obtained by subtracting the first voltage from the later voltage, the rate of change in a voltage is obviously a negative value when the performance deterioration of the fuel cell stack 50 occurs. Therefore, the reference value is also expressed as a negative number, and the expression of a specific value as X means that the reference value of the rate of change in the average cell voltage may be different depending on each output current region.

Figure 11:
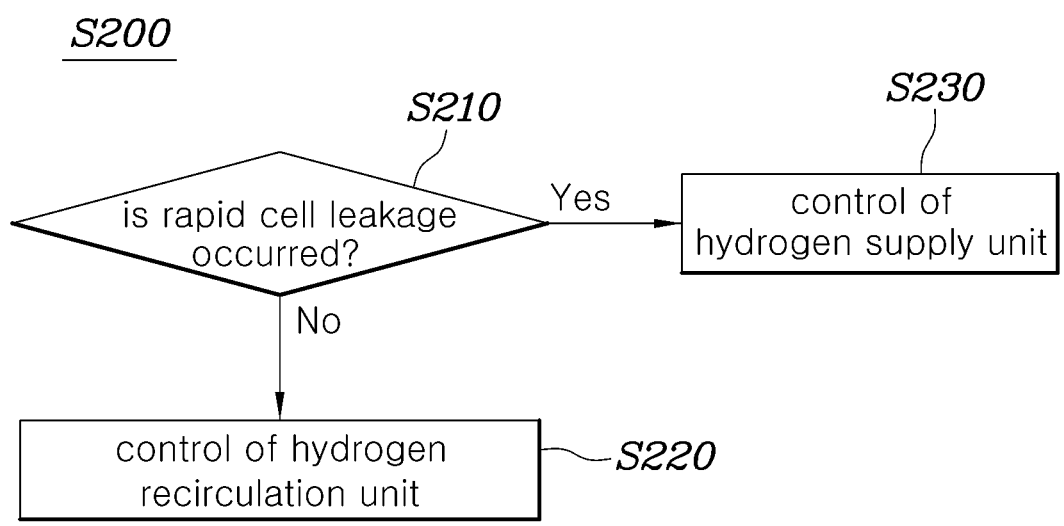
FIG. 11 is a flowchart showing a local flooding prevention step in a low current operation mode of a method for controlling a fuel cell system according to an embodiment of the present disclosure.

FIG. 11 is a flowchart showing the local flooding prevention step (S200) in a low current operation mode of a method for controlling a fuel cell system according to an embodiment of the present disclosure.

Referring to FIG. 11, in the method for controlling the fuel cell system according to embodiments of the present disclosure, the local flooding prevention step of the fuel cell stack (S200) includes the steps of controlling the hydrogen recirculation unit to change the recirculation ratio of the hydrogen discharged from the outlet of the anode by the control unit (S220) and controlling the hydrogen supply unit to increase the flow rate of the hydrogen supplied to the anode by the control unit (S230). Each step may be performed only when the target output current corresponds to the low current region.

As seen above, referring to FIG. 8, an amount of the condensate discharged from the anode is the highest when the recirculation ratio of discharged hydrogen is changed in all operation modes of low current, medium current, and high current. That is, it can be seen that the condensate at the anode to which hydrogen is supplied is most effectively discharged when the recirculation ratio of the discharged hydrogen is changed.

In addition, the case when the flow rate of the supplied hydrogen and air is increased and the case when the pressure difference of the supplied hydrogen and air is changed are the next effective method after the case when the recirculation ratio of the discharged hydrogen is changed. Although the difference in the condensate discharge effect is not large and similar in the two cases, the case when the flow rate of the supplied hydrogen and air is increased is advantageous in terms of power consumption or durability according to the system control, as seen above.

Therefore, the control unit of the fuel cell system according to embodiments of the present disclosure controls the hydrogen recirculation unit to change the recirculation ratio of the hydrogen discharged from the anode outlet, which is the most effective method for discharging the condensate when the target output current is in the low current region (S220), but controls the hydrogen supply unit to increase the flow rate of the hydrogen supplied to the anode (S230) when a problem such as the rapid cell leakage occurs (S210). As a result, the control unit prevents the flooding phenomenon due to the accumulation of the condensate in the fuel cell stack 50.

That is, the control of the hydrogen recirculation unit 40 or the hydrogen supply unit 20 by the control unit 10 is meaningful in that it is applied only when the target output current corresponds to the low current region.

Figure 12:
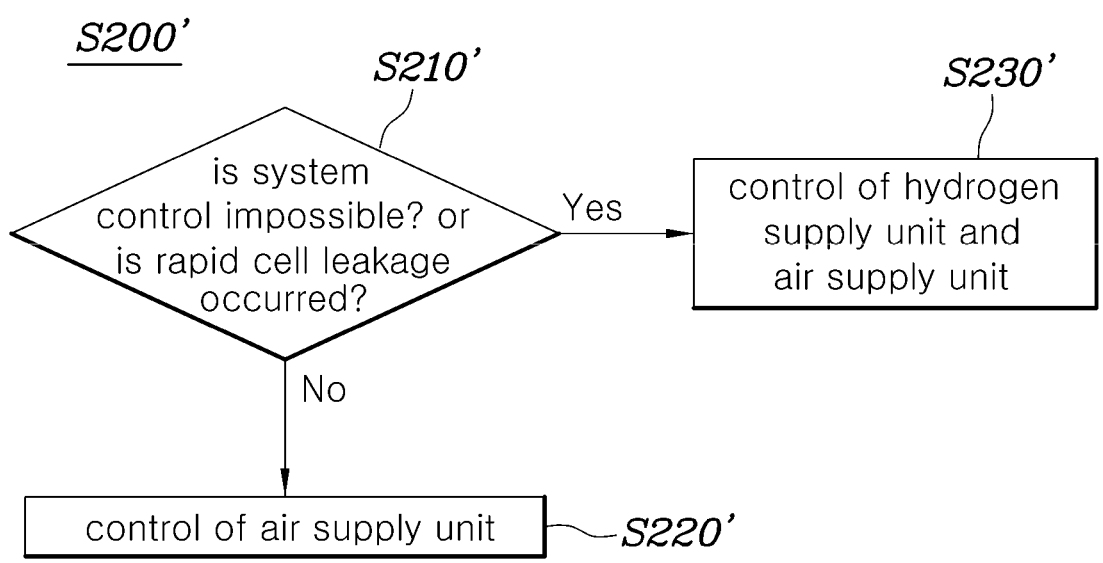
FIG. 12 is a flowchart showing a local flooding prevention step in a medium current operation mode and a high current operation mode in a method for controlling a fuel cell system according to an embodiment of the present disclosure.

FIG. 12 is a flowchart showing the local flooding prevention step (S200') in a medium current operation mode and a high current operation mode in a method for controlling a fuel cell system according to an embodiment of the present disclosure.

Referring to FIG. 12, in the method for controlling the fuel cell system according to embodiments of the present disclosure, the step of preventing local flooding of the fuel cell stack (S200') includes the steps of controlling the air supply unit to increase the flow rate of the air supplied to the cathode (S220') and controlling the hydrogen supply unit and the air supply unit to change the pressure difference of the hydrogen and air supplied to the anode and the cathode by the control unit (S230'). Each step may be performed only in the case of the target output current corresponds to the high current region or the medium current region.

As previously seen, referring to FIG. 9, an amount of the condensate discharged from the cathode is the highest when the flow rate of the supplied hydrogen and air is increased in all operation modes of low current, medium current, and high current. That is, it can be seen that the condensate at the cathode to which air is supplied is most effectively discharged when the flow rate of the supplied hydrogen and air is increased.

In addition, when the flow rate of the supplied hydrogen and air is increased, the case where the pressure difference of the supplied hydrogen and air is changed is the next most effective for discharging the condensate, as seen above.

Therefore, the control unit of the fuel cell system according to embodiments of the present disclosure controls the air supply unit to increase the flow rate of the air supplied to the cathode, which is the most effective method for discharging the condensate when the target output current corresponds to the high current region and the medium current region (S220'), but controls the hydrogen supply unit and the air supply unit to change the pressure difference of the hydrogen and air supplied to the anode and the cathode (S230') when a problem such as the rapid cell leakage occurs (S210'), thereby preventing the flooding phenomenon due to the accumulation of the condensate in the fuel cell stack 50.

That is, controlling only the air supply unit 30 by the control unit 10 or controlling the air supply unit 30 and the hydrogen supply unit 20 simultaneously by the control unit 10 is meaningful in that it is applied only when the target output current corresponds to the high current region and the medium current region.

On the other hand, referring to FIG. 10, after the step of preventing local flooding of the fuel cell stack of the fuel (S200), the method for controlling the fuel cell system according to embodiments of the present disclosure may further include the step of reexamining whether the changed output current corresponds to the target output current depending on the control result of the hydrogen supply unit, the air supply unit, or the hydrogen recirculation unit (S300).

As seen above, the control unit 10 may remeasure the changed output current by controlling the hydrogen supply unit 20, the air supply unit 30, or the hydrogen recirculation unit 40, and may compare the changed output current with the upper limit value of the target output current. Thus, if the changed output current is a value lower than the upper limit value, the control unit 10 may continue to maintain the system control for flooding prevention, and if the changed output current is a value higher than the upper limit value, the control unit 10 may terminate without further controlling the hydrogen supply unit 20, the air supply unit 30, or the hydrogen recirculation unit 40.

Accordingly, it is possible to determine whether the changed output current according to the control of the control unit 10 falls within the range of the previously classified output current or is deviated from the corresponding range, and as a result, different control method can be applied depending on the output current region. For example, when the output current changed as the control unit 10 controls the hydrogen recirculation unit 40 or the hydrogen supply unit 20 in the low current operation mode changes to the medium current region, the control unit 10 may terminate the control method according to the existing low current operation mode, and then, newly applies the control method according to the medium current operation mode.

Although embodiments of the present disclosure have been shown and described with reference to specific embodiments, it will be apparent to those of ordinary skill in the art that embodiments of the present disclosure can be variously improved and changed without departing from the spirit of embodiments of the present disclosure provided by the following claims.

What is claimed is:

1. A fuel cell system comprising:
   a fuel cell stack that comprises an anode to which hydrogen is supplied, a cathode to which air is supplied, and a membrane electrode assembly (MEA) between the anode and the cathode;
   a hydrogen supply unit that is configured to supply hydrogen to the anode;
   an air supply unit that is configured to supply air to the cathode;
   a hydrogen recirculation unit that is connected to the anode to recirculate discharged hydrogen from an outlet to an inlet; and a control unit that, in a constant current operation mode in which an output current of the fuel cell stack is constant, is configured to control the hydrogen supply unit, the air supply unit, or the hydrogen recirculation unit differently depending on a size of a target output current to prevent local flooding of the fuel cell stack in the constant current operation mode, wherein the control unit is forth her configured to select a cu rent region ling to the target output current;

wherein the current region comprises a high current region, a medium current region, and a low current region depending on the size of the target output current; and wherein the control unit is further configured to control the hydrogen supply unit the air supply unit, or the hydrogen recirculation unit differently depending on the current region corresponding to the target output current.

2. The fuel cell system according to claim 1, wherein the control unit is further configured to measure a rate of change in an average cell voltage or a rate of change in a moisture content of an electrode membrane of the fuel cell stack depending on the size of the target output current, and controls the hydrogen supply unit, the air supply unit, or the hydrogen recirculation unit differently depending on the measurement result.

3. The fuel cell system according to claim 1, wherein the control unit is further configured to control the air supply unit to increase a flow rate of air supplied to the cathode when the target output current corresponds to the high current region and the medium current region.

4. The fuel cell system according to claim 2, wherein the control unit is further configured to control the hydrogen supply unit and the air supply unit to change a pressure difference of the hydrogen and air supplied to the anode and the cathode when the control of the system is impossible or a rapid cell leakage phenomenon occurs.

5. The fuel cell system according to claim 1, wherein the control unit is further configured to control the hydrogen recirculation unit to change a recirculation ratio of the hydrogen discharged from an outlet of the anode when the target output current is in the low current region.

6. The fuel cell system according to claim 5, wherein the control unit is further configured to control the hydrogen supply unit to increase a flow rate of the hydrogen supplied to the anode when a rapid cell leakage phenomenon occurs.

7. The fuel cell system according to claim 1, wherein the control unit is further configured to reexamine whether the output current changed according to the control result of the hydrogen supply unit, the air supply unit, or the hydrogen recirculation unit corresponds to the target output current.

8. A method for controlling a fuel cell system, the fuel cell system comprising:
a fuel cell stack that comp rise s a anode to which hydrogen is supplied, a cathode to which air is supplied, and a membrane assembly (MEA) between the anode and the cathode;
a hydrogen supply unit that is configured to supply the hydrogen to the anode;
an air supply unit that is configured to supply air to the cathode;
a hydrogen recirculation unit that is connected to the anode to recirculate discharged hydrogen from an outlet to an inlet; and
a control unit that, in a constant current operation mode in which an output current of the fuel cell stack is constant, is configured to control the hydrogen supply unit, the air supply unit, or the hydrogen recirculation unit differently depending on a size of a target output current to prevent local flooding of the fuel cell stack in the constant current operation mode;

wherein the control unit is further configured to select a current region corresponding to the target output current; and wherein the current region comprises a high current region, a medium current region, and a low current region depending on the size of the target output current;

the method comprising steps of:
operating the fuel cell stack in the constant current operation mode in which the output current is constant by the control unit; and
controlling the hydrogen supply unit, the air supply unit, or the hydrogen recirculation unit differently depending on the size of the target output current by the control unit to prevent local flooding of the fuel cell stack in the constant current operation mode.

9. The method of claim 8, wherein the step of operating in the constant current operation mode comprises steps of:
examining the output current of the fuel cell stack by the control unit; and
classifying whether the output current corresponds to a target output current range.

10. The method of claim 8, further comprising a step of measuring a rate of change in an average cell voltage or a rate of change in a moisture content of an electrode film of the fuel cell stack depending on the size of the target output current by the control unit, after the step of operating in the constant current operation mode.

11. The method of claim 8, wherein the step of controlling comprises steps of:
controlling the hydrogen recirculation unit to change a recirculation ratio of the hydrogen discharged from an outlet of the anode by the control unit; and
controlling the hydrogen supply unit to increase a flow rate of the hydrogen supplied to the anode by the control unit, and
wherein each of the steps of controlling the hydrogen recirculation unit and controlling the hydrogen supply unit is performed only when the target output current corresponds to a low current region.

12. The method of claim 8, further comprising, after the step of controlling, a step of reexamining whether the output current changed depending on the control result of the hydrogen supply unit, the air supply unit, or the hydrogen recirculation unit by the control unit corresponds to the target output current.

13. A method for controlling a fuel cell system, the fuel cell system comprising:
a fuel cell stack that comprises an anode to which hydrogen is supplied, a cathode to which air is supplied, and a membrane electrode assembly (MEA) between the anode and the cathode;
a hydrogen supply unit that is configured to supply hydrogen to the anode;
a air supply is configured to supply air the cathode;
a hydrogen unit that is connected to the anode to recirculate discharged hydrogen from an outlet to an inlet; and
a control unit that in a constant current operation mode in which an output current of the fuel cell stack is constant, is configured to control the hydrogen supply unit, the air supply unit, or the hydrogen recirculation unit differently depending on a size of a target output current to prevent local flooding of the fuel cell stack in the constant current operation mode, the method comprising the steps of:
- operating, by the control unit, the fuel cell stack in the constant current operation mode in which the output current is constant; and
- controlling the hydrogen supply unit, the air supply unit, or the hydrogen recirculation unit differently depending on the size of the target output current, by the control unit, to prevent local flooding of be fuel cell ent operation mode wherein the step of controlling comprises steps of:
- controlling the air supply unit to increase a flow rate of the air supplied to the cathode by the control unit; and
- controlling the hydrogen supply unit and the air supply unit to change a pressure difference of the hydrogen and air supplied to the anode and the cathode by the control unit.

14. A vehicle comprising the fuel cell system of claim 1.

* * * * *